UNITED STATES PATENT OFFICE.

AMBROSE MONELL, OF NEW YORK, N. Y.

METHOD OF SEPARATING NICKEL AND COPPER SULFIDS.

No. 802,012.  Specification of Letters Patent.  Patented Oct. 17, 1905.

Application filed January 19, 1903. Serial No. 139,630.

*To all whom it may concern:*

Be it known that I, AMBROSE MONELL, of New York, in the county and State of New York, have invented a new and useful Method of Separating Nickel and Copper Sulfids, of which the following is a full, clear, and exact description.

In the reduction of ores containing nickel and copper where a matte is produced containing sulfids of nickel, copper, and iron a process has been devised in which a separation of the nickel sulfid is effected by the use of sodium sulfid, advantage being taken of its power of dissolving the sulfids of copper and iron freely and forming a solution of less specific gravity than the nickel sulfid. The matte mixed with coke and sulfate of sodium has been charged into a cupola-furnace. When this charge is smelted, the sodium sulfate is reduced by the coke to sodium sulfid and, forming a solution with part of the copper sulfid and iron sulfid, flows with the undissolved and melted sulfids of nickel, copper, &c., through the tap-hole, which is kept constantly open, into molds, where the molten constituents separate in accordance with their specific gravity, the sodium sulfid containing the dissolved copper and iron sulfids floating on the surface and the undissolved sulfids settling to the bottom. When the contents of the mold have solidified, the parts are separated by fracture and the tops containing the copper and iron are recharged into a smelting-furnace, where the sodium sulfid is fluxed off in an iron slag, being then lost. The bottoms contain most of the nickel sulfid of the original matte; but owing to the imperfection of the separation they also contain so much copper sulfid and iron sulfid that it is necessary to resmelt them with fresh additions of coke and sodium sulfate, and thus to repeat the smelting and separation to the fourth or fifth time before the bottoms are brought to sufficient degree of freedom from iron and copper to enable the resultant nickel sulfid to be economically subjected to the succeeding steps of the refining process. The process as thus carried on is slow and wasteful and because of the cost of materials and the amount of labor and handling required adds greatly to the expense of the nickel or nickel oxid, which is the final product. I have discovered that these difficulties can be overcome and the separation rendered quick and inexpensive by the following process.

Instead of smelting the compound matte, as heretofore, in a cupola-furnace and running the product continuously into molds I so smelt the matte that when melted it will remain in a molten state subject to the high temperature of a furnace for a considerable period of time, during which I find that the copper and iron sulfids will be thoroughly dissolved by the sodium sulfid, and in one melting a good separation can be effected, and by two such treatments results are obtained equal or superior to the results of the four or five meltings which have been employed heretofore. For this purpose I employ as the smelting-furnace an open-hearth reverberatory furnace lined with magnesite brick, as I find that silica-lined furnaces are quickly destroyed by fluxing with the sodium sufid. Into such furnaces I introduce a charge of nickel-copper-iron matte, either solid or molten, together with coke and sodium sulfate, the latter being preferably present in the proportion of sixty per cent. of the weight of the matte and the coke in the proportion of fifteen per cent. of the matte. The sulfate is preferably added in the form of commercial niter-cake. Where, for example, a fifty-ton charge of matte is treated containing, say, forty-five per cent. of nickel sulfid and thirty-five per cent. of copper sulfid, it is melted in the furnace and retained subject to the heat for some time—say four to five hours after fusion has occurred—during which time it is preferably "poled"—that is to say, treated by immersing beneath its surface poles of green wood, which evolve hydrocarbon gases and vapors, and thus aid in the reduction of the sulfate and produce an agitation of the material, which facilitates and renders more thorough the solution of the sulfids to be removed. Nearly complete solution of the copper and iron sulfids in the sodium sulfid reduced from the niter-cake is thus effected, and the molten charge may be tapped from the furnace and allowed to separate in molds; but to get the best results I tap the different strata from the furnace separately, tapping first the solution of copper and iron sulfids floating on the surface of the bath, and finally tapping the undissolved nickel sulfid, or the order of tapping may be reversed, the lower stratum of nickel sulfid being removed first. The great proportion of the iron and copper is thus separated, the nickel sulfid obtained being nearly pure. Where greater purity is desired, the nickel sulfid may be recharged into the furnace and treated again in like manner.

The skilled metallurgist will be able to modify the apparatus and also to use other solvent materials. For example, sodium sulfid may be charged into the furnace instead of sodium sulfate, in which case, as no reduction is required, the coke may be omitted or a less quantity of it employed, and even when sodium sulfate is used deoxidation may be performed by the operation of poling without the use of coke or with only a little coke.

Instead of sodium sulfid I may employ the sulfids of other alkaline metals or sulfid of manganese.

I claim—

1. The method herein described of separating metallic sulfids, which consists in adding to a matte containing such sulfids, a material which is solvent for some of the sulfids therein, heating the mixture to the point of fusion of said solvent, maintaining the mass in fusion until substantially all of the soluble sulfids have been dissolved, and allowing the undissolved sulfid to settle and separating it from the dissolved sulfid or sulfids.

2. The method herein described of separating metallic sulfids, which consists in adding to a matte containing such sulfids, a material which is a solvent for some of the sulfids therein, heating the mixture to the point of fusion of said solvent, agitating the mass and maintaining it in fusion until substantially all of the soluble sulfids have been dissolved, and allowing the undissolved sulfid to settle and separating it from the dissolved sulfid or sulfids.

3. The method herein described of separating metallic sulfids, which consists in adding to a matte containing such sulfids, a material which is a solvent for some of the sulfids therein, heating the mixture to the point of fusion of said solvent, maintaining the mass in fusion until substantially all of the soluble sulfids have been dissolved, and allowing the undissolved sulfid to settle and withdrawing the molten strata separately.

4. The method herein described of separating metallic sulfids, which consists in adding to a matte containing such sulfids, in an open-hearth furnace, a material which is a solvent for some of the sulfids therein, heating the mixture to the point of fusion of said solvent, agitating the mass and maintaining it in fusion until substantially all of the soluble sulfids have been dissolved, and allowing the undissolved sulfid to settle and separating it from the dissolved sulfid or sulfids.

5. The method herein described of separating metallic sulfids, which consists in adding to a matte containing such sulfids, in an open-hearth furnace, a material which is a solvent for some of the sulfids therein, heating the mixture to the point of fusion of said solvent, agitating the mass and maintaining it in fusion until substantially all of the soluble sulfids have been dissolved, and allowing the undissolved sulfid to settle and withdrawing the molten strata separately.

6. The method herein described of separating metallic sulfids, which consists in adding to a matte containing such sulfids sodium sulfate and a reducing agent for the sulfate, heating the mixture to the point of fusion of the resultant solvent, maintaining the mass in fusion until substantially all of the soluble sulfids have been dissolved, and allowing the undissolved sulfid to settle and separating it from the dissolved sulfid or sulfids.

7. The method herein described of separating metallic sulfids, which consists in adding to a matte containing such sulfids, a material which is a solvent for some of the sulfids therein, heating the mixture to the point of fusion of said solvent, poling the mass and maintaining it in fusion until substantially all of the soluble sulfids have been dissolved, and allowing the undissolved sulfid to settle and separating it from the dissolved sulfid or sulfids.

8. The method of separating metallic sulfids, which consists in adding to a matte containing such sulfids, in an open-hearth furnace, a material which is a solvent for some of the sulfids therein, poling the mass, and maintaining it in fusion until substantially all of the soluble sulfids have been dissolved, and allowing the undissolved sulfid to settle and separating it from the dissolved sulfid or sulfids.

9. The method of separating metallic sulfids, which consists in adding to a matte containing such sulfids, in an open-hearth furnace, a material which is a solvent for some of the sulfids therein, poling the mass, and maintaining it in fusion until substantially all of the soluble sulfids have been dissolved, and allowing the undissolved sulfid to settle and withdrawing the molten strata separately.

In testimony whereof I have hereunto set my hand.

AMBROSE MONELL.

Witnesses:
 ERVU F. WOOD,
 BENO B. GATTELL.